(12) United States Patent
Oh et al.

(10) Patent No.: US 9,115,651 B2
(45) Date of Patent: Aug. 25, 2015

(54) METHOD OF CONTROLLING CVVT ACCORDING TO CURRENT CONTROL FOR OIL CONTROL VALVE

(71) Applicants: Hyundai Motor Company, Seoul (KR); Kia Motors Corporation, Seoul (KR)

(72) Inventors: Young Kyu Oh, Gwacheon-si (KR); Young-Joon Park, Seoul (KR); Chulho Yu, Seoul (KR); Yoonho Cho, Uiwang-si (KR); Il Joong Hwang, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 60 days.

(21) Appl. No.: 14/145,124

(22) Filed: Dec. 31, 2013

(65) Prior Publication Data

US 2015/0007787 A1 Jan. 8, 2015

(30) Foreign Application Priority Data

Jul. 2, 2013 (KR) .................... 10-2013-0076956

(51) Int. Cl.
*F01L 1/34* (2006.01)
*F02D 13/02* (2006.01)

(52) U.S. Cl.
CPC ................... *F02D 13/0215* (2013.01)

(58) Field of Classification Search
CPC ............................. F02D 13/0215; F02D 13/02
USPC ............................................ 123/90.15, 90.17
See application file for complete search history.

(56) References Cited

U.S. PATENT DOCUMENTS

| 5,623,896 A | 4/1997 | Kato et al. |
| 6,820,578 B2 * | 11/2004 | Kanada et al. ............. 123/90.15 |
| 8,360,021 B2 | 1/2013 | Toda et al. |
| 2003/0079703 A1 | 5/2003 | Iizuka et al. |
| 2013/0000575 A1 | 1/2013 | Park |

* cited by examiner

*Primary Examiner* — Zelalem Eshete
(74) *Attorney, Agent, or Firm* — Morgan, Lewis & Bockius LLP

(57) ABSTRACT

A method of controlling a CVVT may include a) checking whether a predetermined time has passed, after engine starts. b) locking an actuator by driving oil control valve with different driving currents in accordance with whether a predetermined time has passed after the engine starts. c) unlocking the actuator or feed-backing control cam phase in accordance with whether the actuator is unlocked. d) feed-backing control cam phase or locking the actuator by driving oil control valve with predetermined current in accordance with whether control cam phase is not reached before the actuator is locked. e) driving the oil control valve with predetermined current to maintain the control cam phase or turning off the oil control valve, after feed-backing control cam phase or locking the actuator by driving the oil control valve with predetermined current in accordance with whether the control cam phase is not reached before the actuator is locked.

7 Claims, 9 Drawing Sheets

Pin is locked in the middle position

METHOD OF CONTROLLING CVVT ACCORDING TO CURRENT CONTROL FOR OIL CONTROL VALVE

CROSS-REFERENCE TO RELATED APPLICATION

The present application claims priority to Korean Patent Application No. 10-2013-0076956 filed on Jul. 2, 2013, the entire contents of which is incorporated herein for all purposes by this reference.

BACKGROUND OF THE INVENTION

1. Field of the Invention

The present invention relates to a method of controlling a continuously variable valve timing (hereafter, referred to as a "CVVT" for convenience) according to current control for an oil control valve (hereafter, referred to as an "OCV" for convenience) which can optimally control a CVVT by controlling current control for an OCV.

2. Description of Related Art

In general, internal combustion engines, apparatuses that generate power by receiving air and fuel from the outside and burning them in a combustion chamber, include an intake valve for sucking the air and fuel into the combustion chamber and an exhaust valve for discharging explosion gas burned in the combustion chamber, and the intake and exhaust valves are opened/closed by the rotation of a camshaft that rotates with rotation of a crankshaft.

It is required to make the timing of opening/closing the valves different in accordance with the degree of the engine speed or the degree of engine load, depending on the traveling conditions of a vehicle, in order to increase efficiency of the engine.

In particular, the timing of opening/closing the intake valve has a large influence on the charging efficiency, and when the intake valve is opened in advance, the valve overlap period increases and intake/exhaust inertia flow can be sufficiently used at a high speed, so the volume efficiency increases, but at a low speed, the volume efficiency decreases due to an increase in the amount of remaining gas and the discharge amount of HC (hydrocarbon) increases.

Therefore, the valve overlap period of the camshaft is not determined in accordance with the rotation of the camshaft and a technology of controlling an appropriate valve timing in accordance with the driving state of an engine for predetermined displacement has been used, and this is called a CVVT.

The CVVT is an apparatus (or system) that continuously changes the opening time of the intake and exhaust valves by changing the phase of the camshaft at the intake and exhaust sides in accordance with the load state of a vehicle and the engine speed, for example, that is, an apparatus that changes valve overlap and the object when to reduce exhaust gas, improve performance, and stabilize idling.

The valve timing means the timing where the intake valve and the exhaust valve open or close, the intake process is a process from opening to closing of the intake valve, the exhaust process of a process of discharging exhaust gas from opening to closing of the exhaust valve, and the timings of opening/closing the valves influence the performance of the engine.

The valve overlap means a period with both of the intake and exhaust valves open, and once the valve overlap is set in a common engine, it is constantly used throughout the section of the engine speed, such that it is disadvantageous at a low speed or high speed region.

Accordingly, controlling the valve overlap to fit to the engine load consequently improves the engine output and the part for the control fitting to the engine load is the CVVT.

The CVVT includes a continuously variable valve timing unit, an OCV that is an oil supply device, an OTS (Oil Temperature Sensor), an oil control valve filter and an oil passage, and an auto tensioner etc.

The continuously variable valve timing unit may be mounted on, for example, the camshaft at the exhaust side, the inside includes a housing and a rotor, an advance angle chamber and a retard angel chamber are provided between the housing and the rotor vane, and oil flows inside through the OCV, such that the rotor vane moves.

Further, the OCV is a core part of a CVVT apparatus and controls the valve opening/closing time by changing the passage of engine oil supplied from an oil pump and flowing to the continuously variable valve timing unit under the control of an ECU (Engine Control Unit).

The density of engine oil, which is a working fluid of the continuously variable valve timing unit, change in accordance with temperature and the OTS, a sensor that compensates for the amount of change according to temperature, measures the temperature before the engine oil flows into an OCV and sends it to the ECU and the ECU compensates for the change by driving the OCV.

Further, the oil valve control filter filters impurities in the engine oil flowing to the OCV and the oil tensioner, which is a tension control device of a chain connecting a sprocket of a camshaft at the exhaust side where the CVVT apparatus is disposed with a sprocket of the camshaft at the intake side, ensures stability of performance by preventing delay or deviation of responsiveness and problems in function of the CVVT apparatus.

As the CVVT apparatus, there is a D-CVVT (Dual Continuously Variable Valve Timing) apparatus that handles both of intake and exhaust valves, and since the intake valve moves only in the advance direction of the existing D-CVVT, there is a need of development for further improved optimal control and it is required to more optimally control a common CVVT apparatus too in accordance with the engine speed and load.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a continuous variable valve timing according to current control of an oil control valve having advantages of being able to optimally control an advance angle and a retard angle of an intake cam in accordance with the engine speed and load by continuously changing the timing of opening/closing a valve through a phase change of a camshaft in accordance with the engine speed and load, being able to improve fuel efficiency and performance through optimal valve timing control according to the driving conditions, and being able to control a continuously variable valve timing apparatus by controlling current of an oil control valve.

A method of controlling a continuously variable valve timing apparatus according to current control of an oil control valve, may include a) checking whether a predetermined time may have passed, after an engine starts, b) locking an actuator of the continuously variable valve timing apparatus by driving the oil control valve with different driving currents in accordance with whether the predetermined time may have passed after the engine starts, c) unlocking the actuator or feed-backing control cam phase in accordance with whether the actuator of the continuously variable valve timing apparatus is unlocked, d) feed-backing the control cam phase or locking the actuator by driving the oil control valve with predetermined current in accordance with whether the control cam phase is not reached before the actuator is locked, and e) driving the oil control valve with predetermined current to maintain the control cam phase or turning off the oil control valve, after feed-backing the control cam phase or locking the actuator by driving the oil control valve with predetermined current in accordance with whether the control cam phase is not reached before the actuator is locked.

The predetermined time after the engine starts is two seconds in the step a).

In the step b), when the predetermined time may have passed, the driving current of the oil control valve is 0.34-0.36(A), and when the predetermined time may have not passed, the driving current of the oil control valve is 0.05-0.15(A).

When the unlocking is not performed, the control cam phase is fed back, and when the unlocking is not performed, the actuator is unlocked by making the driving current, which is applied to the oil control valve, at 0.84-0.86(A) for 200 ms.

In the step d), when the control cam phase is not reached before the actuator is locked, the control cam phase is fed back, and when the control cam phase is reached, the actuator is locked by making the driving current of the oil control valve at 0.05-0.15(A).

In the step e), the actuator is locked by locking the actuator with the driving current of the oil control valve made at 0.05-0.15(A) or cutting the driving current.

The actuator may include a housing having a pin groove, a slidable block that is slidably mounted in the housing, a pin that is sliably mounted in a hole of the slidable block, elastically biased in a direction, and selectively engaged to the pin groove, a first channel connecting the housing and the oil control valve, and a second channel continuously connecting to the oil control valve and the hole of the slidable block to selectively operate the pin.

As described above, according to an exemplary embodiment of the present invention, it is possible to optimally control an advance angle and a retard angle of an intake valve, including intermediate phase control, in accordance with the engine sped and load, by continuously changing the timing of opening/closing the intake valve through current control of an oil control valve, and it is possible to perform optimal valve timing control in accordance with each driving condition. therefore, fuel efficiency and performance can be improved and exhaust gas can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
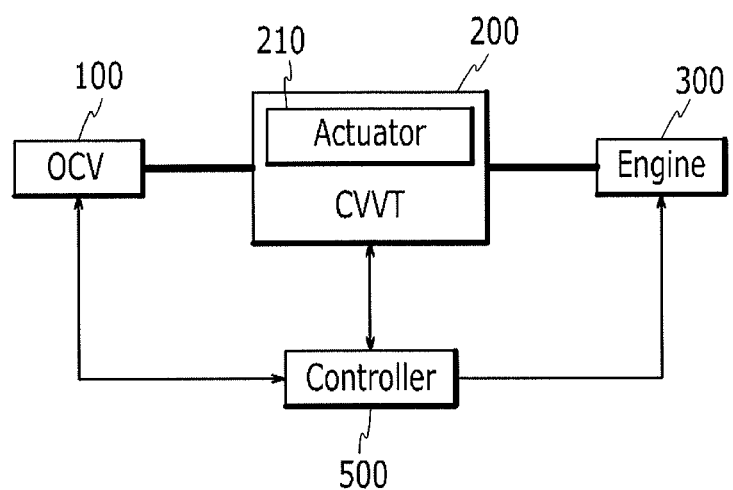
FIG. 1 is a schematic diagram of a system for implementing a method of controlling an intermediate phase continuously variable valve timing according to current control of an oil control valve according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. However, the present invention is not limited to the exemplary embodiments described herein and may be embodied in other ways.

Through the present specification, unless explicitly described otherwise, "including" any components will be understood to imply the inclusion of other components rather than the exclusion of any other components.

FIG. 1 is a schematic diagram of a system for implementing a method of controlling an intermediate phase continuously variable valve timing according to current control of an oil control valve according to an exemplary embodiment of the present invention.

The system may include an OCV (Oil Control Valve) 100, a CVVT (Continuously Variable Valve Timing apparatus) 200, and an engine 300.

Figure 3:
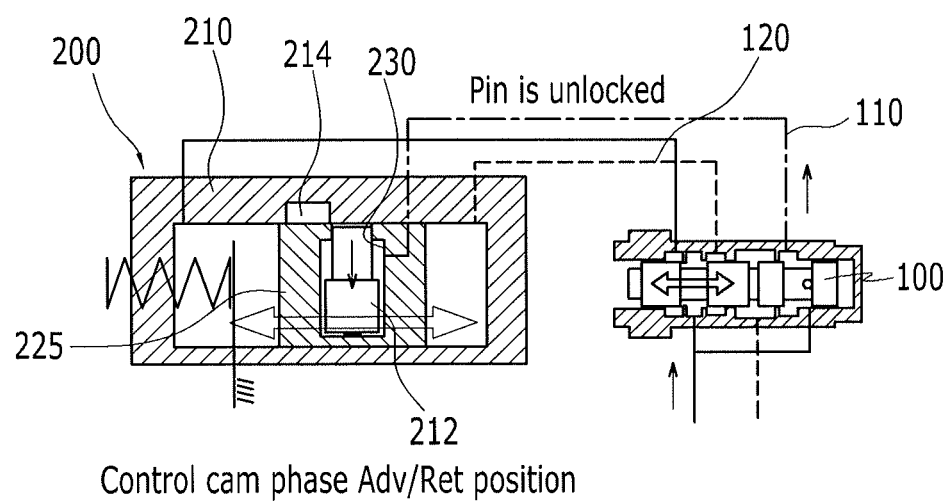
FIGS. 3 to 5 are conceptual diagrams flowchart illustrating the method of controlling an intermediate phase continuously variable valve timing according to current control of an oil control valve according to an exemplary embodiment of the present invention.
Figure 4:
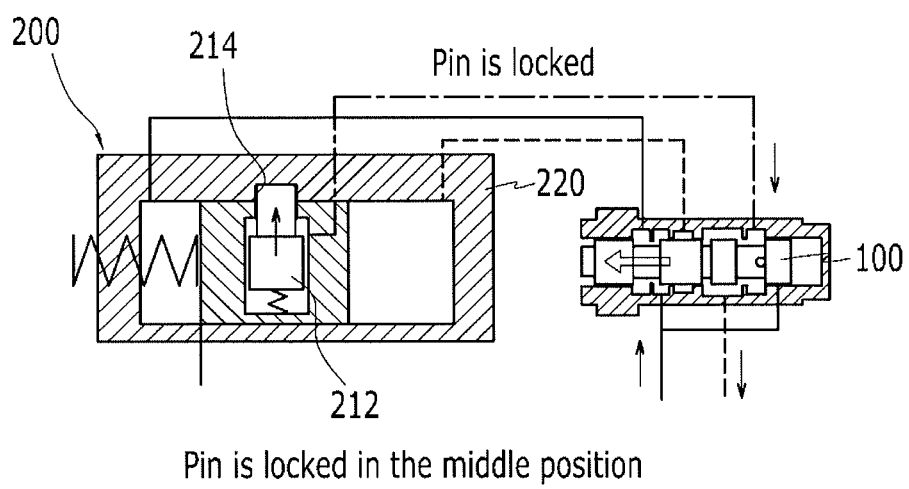

The CVVT 200 includes an actuator 210 that advances/retards a valve timing in accordance with oil provided from the OCV 100 and the actuator 210 may include a pin 212, a pin groove 214 formed in a housing 220, and a slidable block 225 slidably mounted in the housing 220, wherein the slidable block 200 includes a hole 230 to receive the pin 212 for implementing an intermediate phase, as shown in FIGS. 3 and 4.

A channel for intermediate phase control, that is, for operating the pin 212 of the actuator 210 may be formed between the CVVT 200 and the OCV 100. By supplying or returning oil through the channel for operating the pin 212, both of advance (Adv) and retard (Ret) control of a cam phase according to an exemplary embodiment of the present invention can be achieved.

In FIGS. 3 and 4, two different channels 110 and 120 formed between the CVVT 200 and the OCV 100 are channels for advancing or retarding a valve, when the pin 212 is unlocked in the pin groove 214, that is, intermediate phase control is possible.

The first channel 110 is continuously connected to the hole 230 and the second channel 120 is connected to the housing 220.

A controller 500 is one or more microprocessors operated by predetermined programs and/or hardware including the microprocessors and the predetermined programs may include a set of instructions for performing the method of controlling an intermediate phase continuously variable valve timing according to current control of an oil control valve according to an exemplary embodiment of the present invention, which is described below.

The controller 500 may be included in an ECU (Engine Control Unit) for controlling the engine 300, the OCV 100, and the CVVT 200. Alternatively, the controller 500 may include the ECU.

Hereinafter, the method of controlling a continuous variable valve timing according to current control of an oil control valve according to an exemplary embodiment of the present invention is described in detail with reference to the accompanying drawings.

Figure 2:
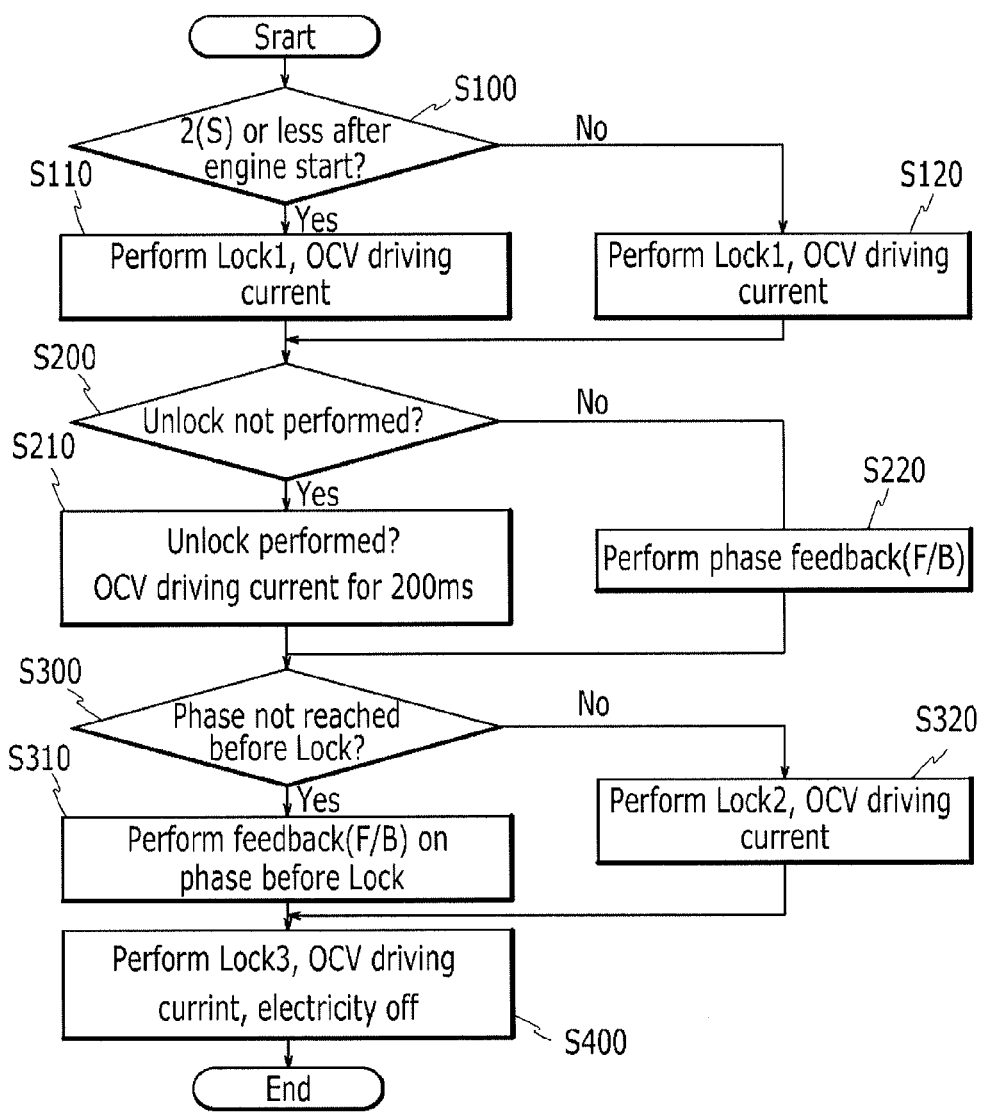
FIG. 2 is a flowchart illustrating the method of controlling an intermediate phase continuously variable valve timing according to current control of an oil control valve according to an exemplary embodiment of the present invention.

FIG. 2 is a flowchart illustrating the method of controlling a phase continuously variable valve timing according to current control of an oil control valve according to an exemplary embodiment of the present invention.

As shown in FIG. 2, the controller 500 checks whether a predetermined time has passed, for example, whether two seconds have passed, after the engine 300 starts (S100).

Figure 5:
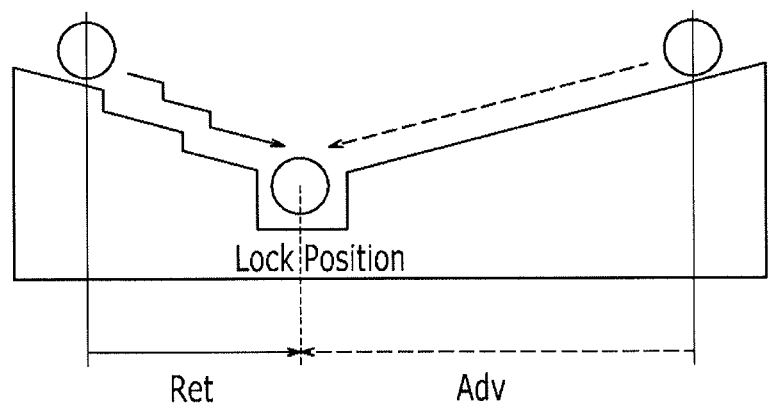

For example, when two seconds have not passed, after the engine starts, the controller 500 applies driving current of 0.34-0.36(A) to the OCV 100 such that the pin 212 of the actuator 210 of the CVVT 200 is at a lock position, that is, the pin 212 is locked in the pin groove 214, as shown in FIGS. 4 and 5 (S110). The driving current 0.34-0.36(A) is current that operates the OCV 100 such that oil is supplied to the actuator 210 through a channel and the pin 212 is locked in the pin groove 214 in a predetermined size.

The state shown in FIG. 4 is the lock position according to an exemplary embodiment of the present invention. In this state, the CVVT can perform the same operation as a D-CVVT of the related art.

For example, when two seconds have passed after the engine starts in S100, the controller 500 applies driving current of 0.05-0.15(A) different from the driving voltage (i.e., 0.34-0.36(A) before two seconds have passed, to the CVVT 200 so that the actuator 210 is locked in another predetermined size (S120).

Next, the controller 500 can check whether the actuator 210 is unlocked (S200).

When the actuator 210 is not unlocked, the controller 500 can unlock the actuator 210 by making the driving current, which is applied to the OCV 100 at 0.84-0.86(A) for about 200 ms (S210). That is, the controller 500 can make the pin 212 be positioned at the unlock position in the pin hole 214 by supplying oil to the actuator 210 by applying driving current of 0.84-0.86(A). When the actuator 210 is at the unlock position, the controller 500 can perform intermediate phase control, that is, both of advance and retard control on valve timing, as shown in FIG. 3, by controlling the OCV 100.

When the actuator 210 is unlocked in 5200, the controller 500 feedbacks the control cam phase and uses it for valve timing control (S220).

Further, the controller 500 can check whether the control cam phase is less than a predetermined target phase before the actuator 210 is locked (S300).

When the control cam phase is less than a predetermined target phase before the actuator 210 is locked, the controller 500 feedbacks the control cam phase and uses it for valve timing control (S310).

When the control cam phase is not less than a predetermined target phase before the actuator 210 is locked, that is, when the control cam phase is the predetermined target phase, the controller 500 locks the actuator 210 by applying driving current of 0.05-0.15(A) to the OCV 100 (S320).

As described above, after the steps S310 and/or S320 are performed, the controller 500 applies driving current of 0.05-0.15(A) to the OCV 100 or cuts the driving current (cuts the electricity) in order to maintain the state of the control cam phase.

Figure 6:
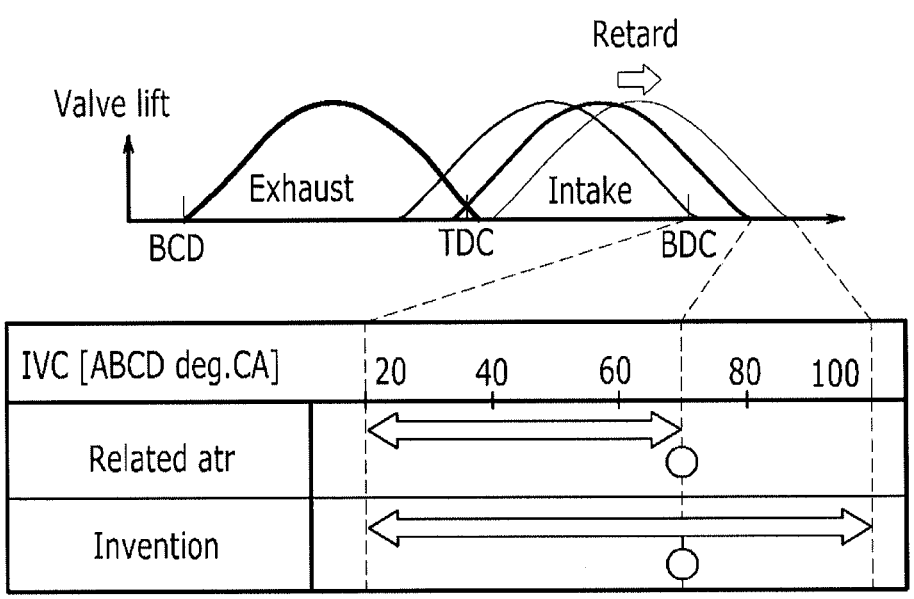
FIGS. 6 and 7 are graphs comparing the present invention with the related art.

According to the exemplary embodiment of the present invention, as shown in FIG. 6, it can be seen that the width of valve control is considerably larger than that of the related art.

Figure 7:
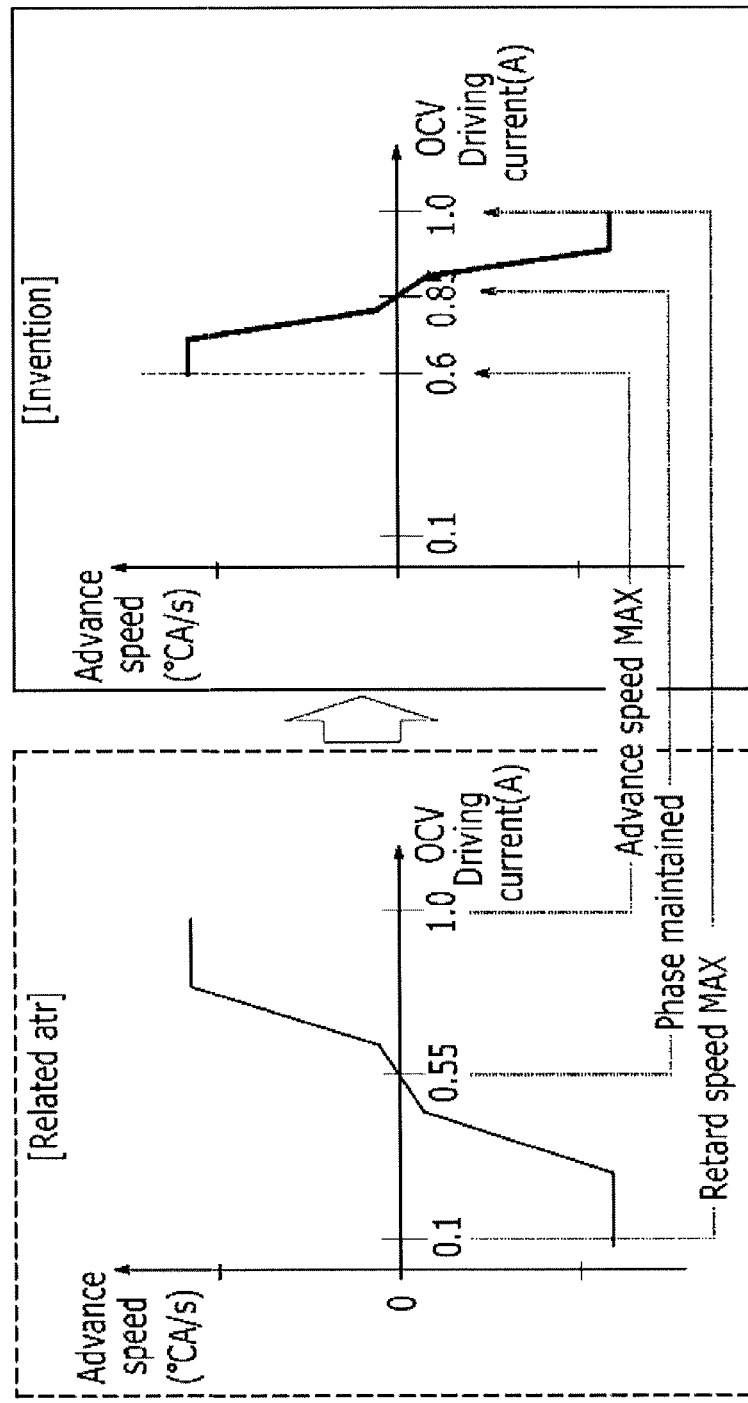

Further, according to an exemplary embodiment of the present invention, as shown in FIG. 7, it can be seen that the intake valve can be controlled in both of advance and retard directions, the intake valve can be controlled only in the advance angle direction in the related art though.

Figure 8:
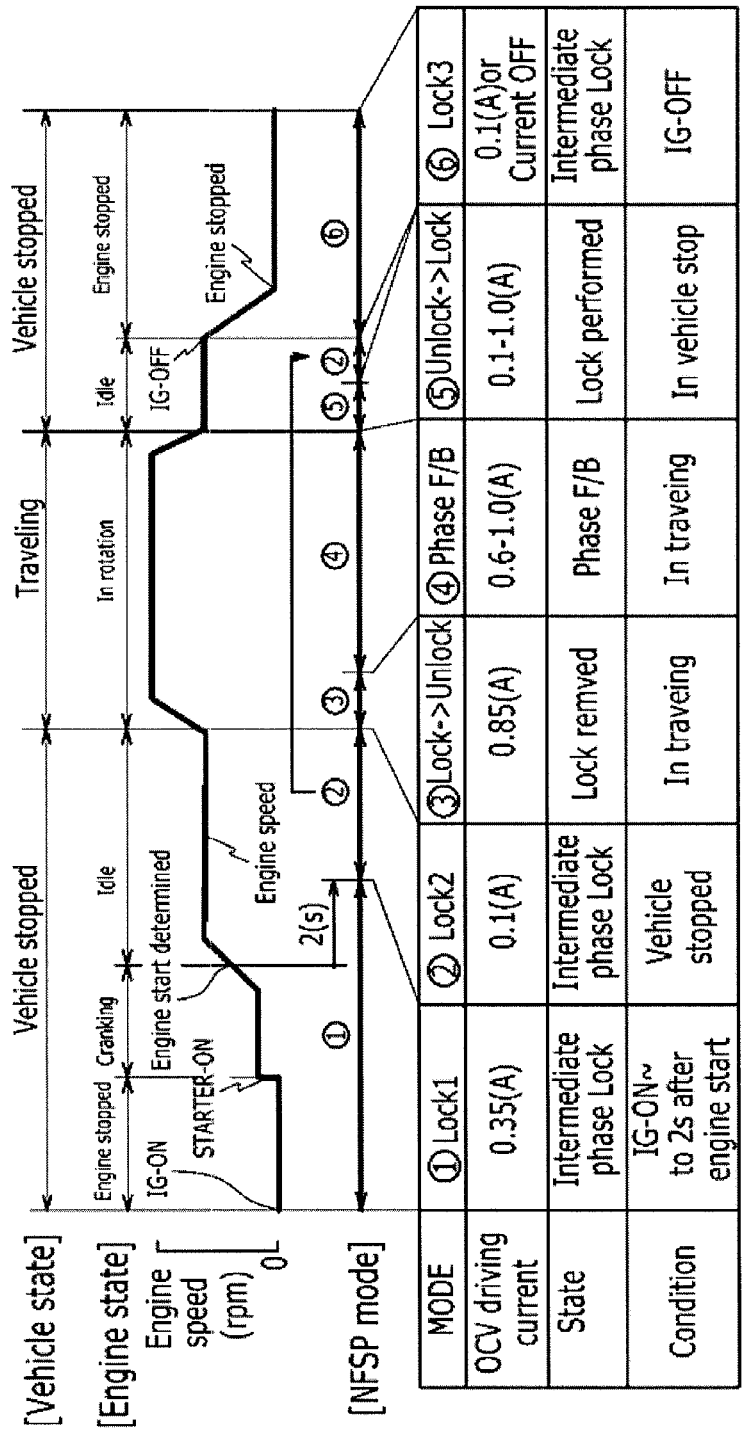
FIGS. 8 and 9 are diagrams illustrating the operation according to an exemplary embodiment of the present invention.
Figure 9:
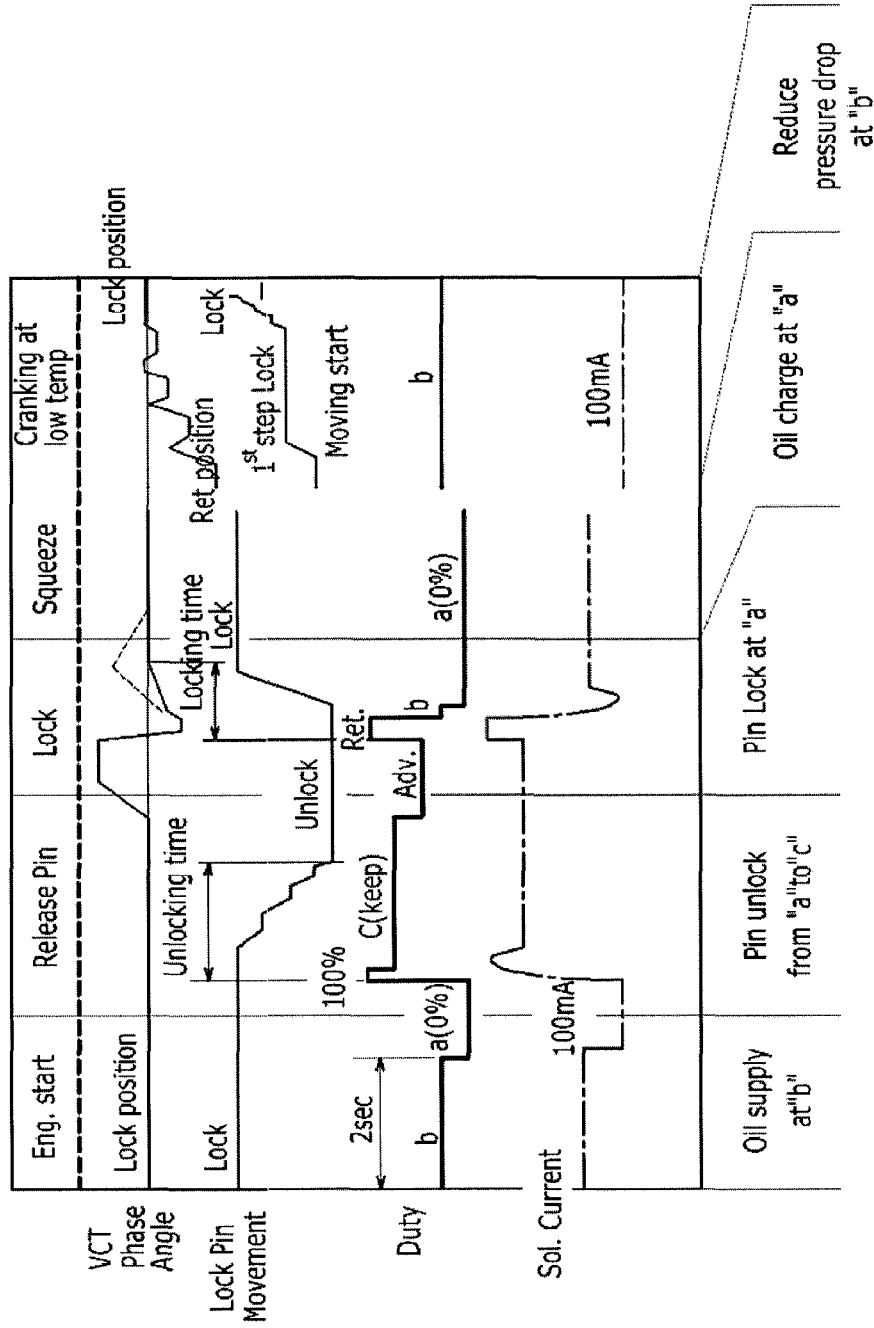

Further, according to an exemplary embodiment of the present invention, as shown in FIGS. 8 and 9, since the intake valve timing can be controlled to be advanced/retarded under each driving condition, fuel efficiency and engine performance can be improved and exhaust gas can be reduced.

For example, according to an exemplary embodiment of the present invention, as shown in FIGS. 8 and 8, since it is possible to control the intake valve timing to be advanced/retarded by changing the lock state into the unlock state at OCV driving current of 0.85(A), fuel efficiency and engine performance can be improved and exhaust gas can be reduced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a continuously variable valve timing apparatus according to current control of an oil control valve, the method comprising:

a) checking whether a predetermined time has passed, after an engine starts;

b) locking an actuator of the continuously variable valve timing apparatus by driving the oil control valve with different driving currents in accordance with whether the predetermined time has passed after the engine starts;

c) unlocking the actuator or feed-backing control cam phase in accordance with whether the actuator of the continuously variable valve timing apparatus is unlocked;

d) feed-backing the control cam phase or locking the actuator by driving the oil control valve with predetermined current in accordance with whether the control cam phase is not reached before the actuator is locked; and e) driving the oil control valve with predetermined current to maintain the control cam phase or turning off the oil control valve, after feed-backing the control cam phase or locking the actuator by driving the oil control valve with predetermined current in accordance with whether the control cam phase is not reached before the actuator is locked.

2. The method of claim 1, wherein the predetermined time after the engine starts is two seconds in the step a).

3. The method of claim 2, wherein in the step b), when the predetermined time has passed, the driving current of the oil control valve is 0.34-0.36(A), and when the predetermined time has not passed, the driving current of the oil control valve is 0.05-0.15(A).

4. The method of claim 3, wherein in the step c), when the unlocking is not performed, the control cam phase is fed back, and when the unlocking is not performed, the actuator is unlocked by making the driving current, which is applied to the oil control valve, at 0.84-0.86(A) for 200 ms.

5. The method of claim 4, wherein in the step d), when the control cam phase is not reached before the actuator is locked, the control cam phase is fed back, and when the control cam phase is reached, the actuator is locked by making the driving current of the oil control valve at 0.05-0.15(A).

6. The method of claim 5, wherein in the step e), the actuator is locked by locking the actuator with the driving current of the oil control valve made at 0.05-0.15(A) or cutting the driving current.

7. The method of claim 1, wherein the actuator includes:
a housing having a pin groove;
a slidable block that is slidably mounted in the housing;
a pin that is sliably mounted in a hole of the slidable block, elastically biased in a direction, and selectively engaged to the pin groove;
a first channel connecting the housing and the oil control valve; and
a second channel continuously connecting to the oil control valve and the hole of the slidable block to selectively operate the pin.

* * * * *